US012762394B1

(12) United States Patent
Pool et al.

(10) Patent No.: US 12,762,394 B1
(45) Date of Patent: Oct. 13, 2026

(54) MANAGING DATA SPARSITY FOR NEURAL NETWORKS

(71) Applicant: NVIDIA Corporation, Santa Clara, CA (US)

(72) Inventors: Jeff Pool, Durham, NC (US); Ganesh Venkatesh, San Jose, CA (US); Jorge Albericio Latorre, San Jose, CA (US); Jack Choquette, Palo Alto, CA (US); Ronny Krashinsky, San Francisco, CA (US); John Tran, Denver, CO (US); Feng Xie, Shanghai (CN); Ming Y. Siu, Santa Clara, CA (US); Manan Patel, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1002 days.

(21) Appl. No.: 17/866,031

(22) Filed: Jul. 15, 2022

Related U.S. Application Data

(63) Continuation of application No. 16/373,301, filed on Apr. 2, 2019, now Pat. No. 11,392,829.

(60) Provisional application No. 62/665,665, filed on May 2, 2018.

(51) Int. Cl.
*G06N 3/08* (2023.01)
*G06F 17/16* (2006.01)
*G06N 3/04* (2023.01)

(52) U.S. Cl.
CPC ............... *G06N 3/08* (2013.01); *G06F 17/16* (2013.01); *G06N 3/04* (2013.01)

(58) Field of Classification Search
CPC ............. G06F 17/16; G06N 3/04; G06N 3/08
See application file for complete search history.

(56) References Cited

U.S. PATENT DOCUMENTS

| | | | | |
|---|---|---|---|---|
| 9,558,156 | B1 * | 1/2017 | Bekas | G06F 17/16 |
| 9,818,059 | B1 * | 11/2017 | Woo | G06F 13/1668 |
| 2018/0173677 | A1 | 6/2018 | Muralimanohar | |
| 2018/0189234 | A1 * | 7/2018 | Nurvitadhi | G06F 17/16 |
| 2018/0189638 | A1 | 7/2018 | Nurvitadhi et al. | |
| 2018/0330275 | A1 | 11/2018 | Jain et al. | |

* cited by examiner

*Primary Examiner* — Michael D. Yaary
(74) *Attorney, Agent, or Firm* — Robert C. Kowert; Kowert, Hood, Munyon, Rankin & Goetzel, P.C.

(57) ABSTRACT

Approaches in accordance with various embodiments provide for the processing of sparse matrices for mathematical and programmatic operations. In particular, various embodiments enforce sparsity constraints for performing sparse matrix multiply-add instruction (MMA) operations. Deep neural networks can exhibit significant sparsity in the data used in operations, both in the activations and weights. The computational load can be reduced by excluding zero-valued data elements. A sparsity constraint is applied across all submatrices of a sparse matrix, providing fine-grained structured sparsity that is evenly distributed across the matrix. The matrix may then be compressed since a minimum number of elements of the matrix are known to have zero value. Matrix operations are then performed using these matrices.

20 Claims, 9 Drawing Sheets

200

$$\begin{pmatrix} a_{11} & a_{12} \ldots & a_{1m} \\ a_{21} & a_{22} \ldots & a_{1m} \\ \ldots & \ldots & \ldots \\ a_{n1} & a_{n2} \ldots & a_{nm} \end{pmatrix} x \begin{pmatrix} b_{11} & b_{12} \ldots & b_{1p} \\ b_{21} & b_{22} \ldots & b_{1p} \\ \ldots & \ldots & \ldots \\ b_{m1} & b_{m2} \ldots & b_{mp} \end{pmatrix} = \begin{pmatrix} c_{11} & c_{12} \ldots & c_{1p} \\ c_{21} & c_{22} \ldots & c_{1p} \\ \ldots & \ldots & \ldots \\ c_{n1} & c_{n2} \ldots & c_{np} \end{pmatrix}$$

Matrix A (sparse) — Matrix B (dense) — Matrix C (product)

FIG. 2A

250

Matrix A
(sparse)

$$\begin{pmatrix} 1 & 1 & 0 & 0 & 0 & 0 & 0 & 1 \\ 1 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{pmatrix}$$

FIG. 2B

300

302

| | | | | | | | |
|---|---|---|---|---|---|---|---|
| 1 | 0 | 0 | 1 | 0 | 0 | 1 | 0 |
| 0 | 0 | 0 | 1 | 0 | 0 | 1 | 0 |
| 0 | 0 | 0 | 1 | 0 | 0 | 0 | 0 |
| 0 | 1 | 0 | 1 | 0 | 0 | 0 | 0 |
| 0 | 1 | 1 | 0 | 0 | 0 | 0 | 1 |
| 0 | 0 | 0 | 0 | 0 | 0 | 1 | 0 |
| 0 | 0 | 0 | 0 | 1 | 0 | 0 | 0 |
| 0 | 0 | 0 | 0 | 1 | 0 | 1 | 0 |
| 0 | 1 | 0 | 0 | 0 | 0 | 1 | 0 |
| 0 | 0 | 0 | 0 | 0 | 1 | 0 | 1 |

FIG. 3A

350

352

| | | | | | | | |
|---|---|---|---|---|---|---|---|
| 1 | 0 | 0 | 0 | 1 | 0 | 0 | 0 |
| 0 | 0 | 0 | 1 | 0 | 0 | 1 | 0 |
| 0 | 0 | 0 | 0 | 0 | 0 | 0 | 0 |
| 1 | 0 | 0 | 1 | 0 | 1 | 1 | 0 |
| 0 | 0 | 0 | 1 | 0 | 0 | 0 | 0 |
| 0 | 1 | 0 | 0 | 1 | 0 | 0 | 1 |
| 1 | 0 | 0 | 0 | 0 | 1 | 0 | 0 |
| 0 | 0 | 1 | 0 | 0 | 0 | 0 | 1 |
| 0 | 0 | 0 | 0 | 0 | 0 | 0 | 1 |
| 1 | 0 | 1 | 0 | 1 | 0 | 0 | 0 |

FIG. 3B

MANAGING DATA SPARSITY FOR NEURAL NETWORKS

CROSS-REFERENCE TO RELATED APPLICATIONS

This application is a continuation of U.S. application Ser. No. 16/373,301, filed on Apr. 2, 2019, entitled "MANAGING DATA SPARSITY FOR NEURAL NETWORKS," which claims priority to U.S. Provisional Application No. 62/665,665, filed May 2, 2018, entitled "SPARSE HMMA." The subject matter of these related applications are hereby incorporated herein by reference.

BACKGROUND

Sparse workloads are common in high-performance computing. For example, sparse matrices can be utilized to represent structures and relationships between objects. Machine learning also often involves sparse matrices in one or more network layers. As machine learning and other computing operations become more complex and utilize larger sets of data, the need to maintain large amounts of data for sparse matrices or data sets becomes problematic as zero-value elements may not impact the outcome but require significant overhead to store and process. High performance of large dense matrix (tensor) computation has also proven to be important for training and inferencing of deep learning applications, but can be expensive to achieve using conventional approaches.

BRIEF DESCRIPTION OF THE DRAWINGS

Various embodiments in accordance with the present disclosure will be described with reference to the drawings, in which:

FIGS. 2A and 2B illustrate matrices of a sparse matrix multiplication task that can be performed in accordance with various embodiments.

FIGS. 3A and 3B illustrate matrices that have the same overall sparsity but distributed according to different sparsity constraints that can utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for an improvement in the speed and computational load for performing matrix operations. In particular, various embodiments provide approaches for applying sparsity constraints for performing sparse matrix multiply-add instruction (MMA) operations. Deep neural networks can exhibit significant sparsity in the data used in operations, both in the activations and weights. Approaches in accordance with various embodiments can reduce the computational load by excluding zero-valued data elements. Various embodiments utilize a sparsity constraint that is applied across all submatrices of a sparse matrix, providing fine-grained structured sparsity that is evenly distributed across the matrix. The matrix man then be compressed based in part on the fact that a minimum number of elements of the matrix are known to have zero value. The matrix operations can then be performed using, for example, smaller matrices but can obtain the same result as if the original, larger matrices were utilized.

Various other functions can be implemented within the various embodiments as well as discussed and suggested elsewhere herein.

Figure 1:
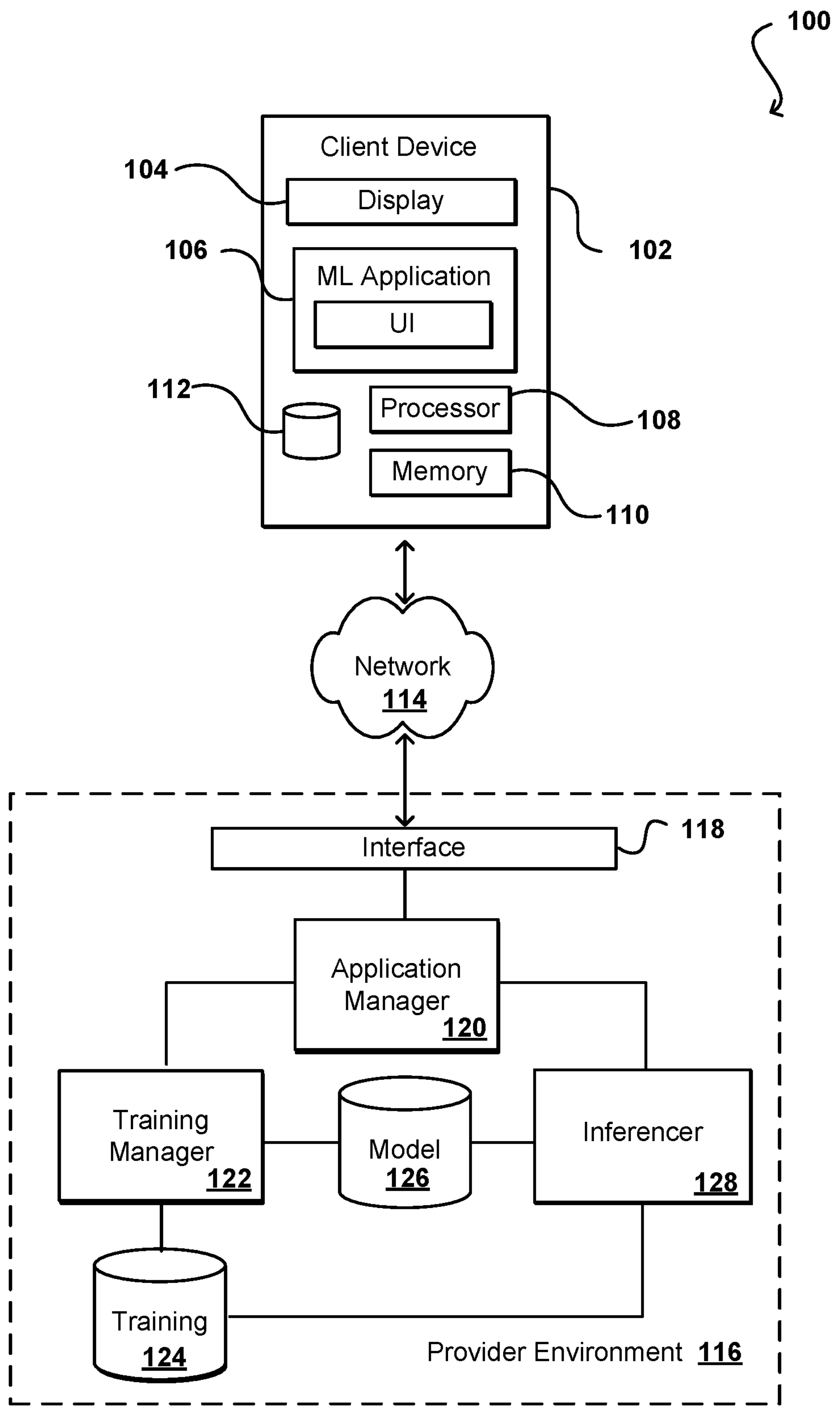
FIG. 1 an example system that can be utilized to implement aspects in accordance with various embodiments.

FIG. 1 illustrates an example environment 100 that can be utilized to implement aspects of the various embodiments. In some embodiments, a user may utilize a client device 102 to provide input, such as data to be processed or instructions to perform an operation, among other such options. The client device 102 can be any appropriate computing device capable of enabling a user to provide instructions or data for processing, such as may include a desktop computer, notebook computer, smart phone, tablet computer, computer workstation, gaming console, and the like. A user can select, provide, or otherwise specify the input via a user interface (UI) of an application 106, referred to herein as a machine learning (ML) application that utilizes machine learning for at least one aspect of the application functionality. The ML application 106 can be executing on the client device 102, although at least some functionality may also operate on a remote device, networked device, or in "the cloud" in some embodiments. The user can provide input to the UI, such as through a touch-sensitive display 104 or by directing movement of a mouse cursor displayed on a display screen, among other such options. The client device can include at least one processor 108 (e.g., a CPU or GPU) to execute the application and/or perform tasks on behalf of the application, and memory 110 for including non-transitory computer-readable instructions for execution by the processor. Data provided to, or generated via, the ML application 106 can be stored locally to local storage 112, such as a hard drive or flash memory, among other such options.

In some embodiments, input received or selected on the client device 102 can be processed on the client device 102 in order to perform the appropriate functionality. In other embodiments, the client device 102 may send the input, or data relating to the input, over at least one network 114 to be received by a remote computing system or service, as may be part of a resource provider environment 116. The at least one network 114 can include any appropriate network, including an intranet, the Internet, a cellular network, a local area network (LAN), or any other such network or combination, and communication over the network can be enabled via wired and/or wireless connections. The provider environment 116 can include any appropriate components for receiving requests and returning information or performing actions in response to those requests. As an example, the provider environment might include Web servers and/or application servers for receiving and processing requests, then returning data or other content or information in response to the request.

Communications received to the provider environment 116 can be received to an interface layer 118. The interface layer 118 can include application programming interfaces (APIs) or other exposed interfaces enabling a user, client device, or other such source to submit requests or other communications to the provider environment. The interface layer 118 in this example can include other components as well, such as at least one Web server, routing components, load balancers, and the like. Components of the interface layer 118 can determine a type of the request (or other communication) and can direct the request to the appropriate system or service. For example, if a communication relates to the training of a neural network, the communication can be directed to an application manager 120, which can be a system or service provided using various resources of the provider environment 116. The communication, or information from the communication, can be directed to a training manager 124, which can select an appropriate model or network and then train the model using relevant training data 124, which in some embodiments might be provided or specified by the received communication. Once a network is trained and successfully evaluated, the network can be stored to a model repository 126, for example, that may store different models or networks for different types of data or processing. If a request is received to the interface layer 118 that includes input for the application that requires processing, information for the request can be directed to an inference module 128 (referred to herein as an "inferencer"), system, or service that can obtain the corresponding trained network, such as a trained generative adversarial network (GAN), from the model repository 126 if not already stored locally. The inferencer 128 can take the input from the ML application 106 executing on the client device 102 and cause the input to be processed using the appropriate trained model(s) to generate one or more inferences.

In various embodiments the processor 108 (or a processor of the training manager 122 or inferencer 128) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used, or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

In some embodiments the matrix multiplication is implemented on a single GPU that includes multiple streaming multiprocessors (SMs). SMs can work independently and in parallel. Each SM can be assigned one or more of the tiles of the sparse matrix for processing as discussed later herein and can perform the appropriate multiplication of those tiles with the dense matrix. The tiling can be performed as part of a pre-processing step in some embodiments, either on the GPU or on a CPU. For large matrices or numbers of tiles, multiple GPUs may be utilized for the processing. The final product can then be sent to the CPU if needed, but it is often kept on the GPU and passed to the next layer of the neural network. The matrices can be of any appropriate size or dimension, and may comprise vectors or multidimensional arrays in some embodiments.

As mentioned, machine learning networks such as deep neural networks can be sparse or involve sparse matrix operations in one or more layers of the networks. If a sparse matrix represents adjacency between objects, the multiplication of a sparse matrix by a vector (SpMV) is accumulating weights of the adjacent objects of each entry. In at least some embodiments it may be desirable to obtain a stable distribution of weights that does not change after redistribution, where finding such distributions may involve the iterative application of SpMV. If multiple independent fields are defined on the objects, like multiple species in combustion codes, then sparse by dense matrix multiplication (SpMM) can be used, as well as potentially batched sparse matrix-vector product algorithms. As heavy workloads involving sparse neural networks and sparse accelerators are becoming increasingly common, there is a desire to improve performance, such as the performance of a SpMM operation involving a sparse matrix multiplied by a dense matrix.

FIG. 2A illustrates a basic example 200 of the form of a matrix multiplication involving a sparse matrix A being multiplied by a dense matrix B. As discussed in more detail elsewhere herein, a "sparse" matrix can correspond to a matrix where the ratio of zero-value entities to non-zero value entities is high, such that significant fraction of the elements in the matrix have a value of zero. This is illustrated in the example sparse matrix 250 of FIG. 2B. A dense matrix B, on the other hand, would have a low ratio of zero-value entities to non-zero value entities, such that few of the elements in the matrix have a value of zero. As illustrated in FIG. 2B, some of the data to be stored for a sparse matrix, which also includes corresponding metadata, corresponds to elements with zero value that do not impact the product of the matrix multiplication.

Sparse matrices as currently utilized have a few standard representation formats, some of which provide for substantial memory requirement reductions by storing only the non-zero entities. The data structure that is appropriate for a given sparse matrix can depend in part upon aspects such as the number and distribution of non-zero entities. Accessing the individual elements becomes more complex and additional structures are needed to be able to correctly and completely recover the original matrix. Some formats, such as dictionary of keys (DOK) or list of lists (LIL) support efficient matrix modification, while other formats such as compressed sparse row (CSR), compressed sparse column (CSC), and compressed sparse block (CSB) support efficient access and matrix operations. These standard formats, however, come with significant overhead, such as twice the overhead of the initial sparse matrix. These standard formats typically allow for skipping of the zero value elements by creating pointers to the non-zero elements, but the pointers themselves take up significant space in the storage of the matrix. These formats generally also have poor memory locality.

In deep learning, a technique referred to as pruning can be used to induce sparsity in the weight values of a neural network. Inducing sparsity can be desirable because it can reduce the amount of memory needed to store the weight values, and it can provide for compression of the network and an improved ability to relocate portions of the network, whether for deployment or at runtime. The weights can be moved onto a memory chip, as well as around the chip, more quickly if they are in a compressed format.

The induced sparsity could also have the benefit of significant computational savings. Using conventional approaches, however, such savings are not realized, or at least to the extent desired. As mentioned, one traditional approach involves representing the sparse matrix in a sparse matrix format, like the CSR, CSC, or CSB formats discussed above. Such an approach requires re-writing software, and managing the storage format explicitly, which often leads to irregular computations. One row might have a lot of zeros, the next might not. Many of these formats require a machine to have the ability to make really irregular accesses. In order to see a significant increase in processing speed, a fairly high sparsity value is required. For a density of 10%, where 90% of the elements are zero, it would be desired to obtain a factor of ten improvement as you are only doing one tenth of the work. This is not realizable, though, as in practice most software sparse algorithms require between about five and twenty percent densities in order to see any speed increase. Even for a sparse matrix of reasonable sparsity, say 50% or 75% sparsity, there will not always be an increase in processing speed. While there may be more natural ways than pruning in which sparsity arises in deep learning, the result is the same in that it is difficult to take advantage of the sparsity due to the irregularity in the sparsity.

Approaches in accordance with various embodiments can therefore attempt to make the sparsity patterns more constrained. Rather than allowing any elements of a matrix to be zero to reach a desired level of sparsity, a sparsity constraint can be applied that restricts the patterns of sparsity that are allowed. For example, consider the example matrix 300 of FIG. 3A. The sparsity of this matrix is 75%, in that ¾ of the elements have zero value and the other ¼ have non-zero values. The sparsity, however, is fairly irregular across the matrix. If the matrix is divided into an array of submatrices 302 of the same size, it can be seen that many of the submatrices have all zero value elements, and other submatrices have all non-zero value elements. Such an approach can impact the distribution of load, as well as other aspects discussed and suggested herein. It may therefore be preferable, for at least some situations, to enforce a sparsity constraint across the various submatrices. For example, consider the matrix 350 illustrated in FIG. 3B. In this example the matrix 350 still has an overall sparsity of 75%. As illustrated, the submatrices 352 in this matrix 350 also each have a sparsity of 75%. It can be seen that enforcing the sparsity at the sub-matrix level reduces the irregularity of the sparsity of the overall matrix. Such an approach can help to more evenly distribute the load when processing the matrix.

It should be noted, however, that the matrices illustrated in FIGS. 3A and 3B are not necessarily sparse matrices, and that a sparse matrix may have many more zero value entries. Approaches in accordance with various embodiments can utilize the sparsity constraint at the submatrix level, allowing for compression of the matrices due in part to the level of sparsity. The sparsity constraint might indicate that out of every set of M elements of a matrix, at most N of them can have non-zero values. By applying a constraint such that the non-zero values are spread out evenly within the matrix, any chunk of a number of elements will have substantially the same amount of work to be performed, which enables load balancing of this sparse workload on a giant machine with a number of processors. Constraining the pattern of the sparsity can thus make the sparse workload friendlier to large, parallel machines that rely on balancing the workload across different processing elements. The balancing of the chunks across the processing elements can be implicit, then, as a scheduler may not have any insight into the differences in workload for different chunks, and will just send work to a processing element that can accept the work. Making the chunks have relatively equivalent workloads can help the scheduler to balance load across the processing elements more effectively. It should be noted that the use of submatrices are not required for all embodiments and that other approaches can be used to enforce a global sparsity constraint evenly across a matrix, as may relate to various other functions, allocations, or selection approaches as would be apparent to one of ordinary skill in the art in light of the teachings and suggestions contained herein.

As mentioned, such approaches can be advantageous for processes such as the training of deep neural networks, which may involve sparse weights or activations for layers of the network. For example, benefits may be obtained when executing sparse Matrix Multiply-Add Instruction (MMA) operations. Deep neural networks can exhibit significant sparsity in the data used in operations, both in the activations and weights. The computational load on the hardware can be reduced by avoiding work relating to the zero-value data elements of these sparse matrices. Many conventional techniques for skipping zero-value elements in computations require processing elements that perform an independent operation. By simply detecting and not feeding zero values to these elements, the effort can be reduced. This does not apply to wide, parallel machines such as GPUs, however. Other techniques require many consecutive zero-value elements before skipping any work. This granularity is not always useful, though, particularly when using high-throughput instructions that work on large block sizes, like MMA.

Building on an MMA matrix-multiplication instruction, approaches in accordance with various embodiments can provide for the skipping of work within various matrix multiplication operations, such as the different dot-product operations performed within the MMA. In one embodiment, as long as a sparsity constraint is satisfied in each row of one operand, the operation can execute at a significantly higher speed (such as twice the speed) with respect to the baseline instruction. In another embodiment, such a result can be realized using an instruction of the same speed and input shape to perform the work of an operand of twice the size. There can be many options utilized for indicating that an input operand data meets this sparsity constraint. For example, the instruction can be allowed to detect zero-value elements and then compact them. Data might also be pre-processed before issuing the instruction. In yet another example, the sparse status and pattern can be stored with the data itself.

There can be various benefits to utilizing such an approach. For example, the sparsity can be more fine-grained than for other approaches, as the entire instruction is not required to be skipped. Further, the re-use of the operands for the MMA instruction allows various sparsity patterns to be exploited over a number of cycles, allowing the technique to be used on GPUs and similar architectures.

Figure 4:
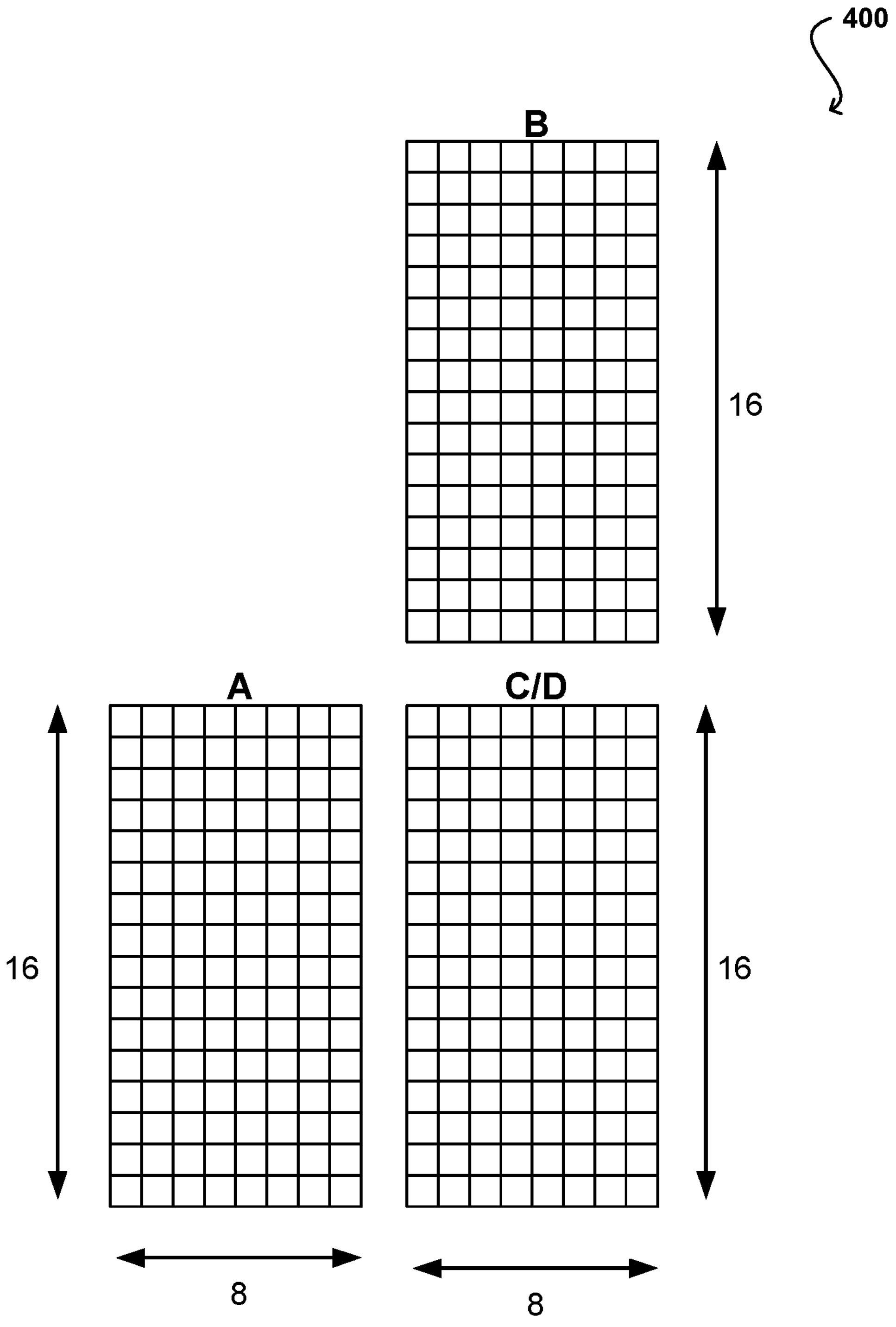
FIG. 4 illustrates an example data layout that can be utilized in accordance with various embodiments.

FIG. 4 illustrates an example data layout 400 that can be utilized with such an embodiment. In this example, there are two input matrices A and B, with an output C/D for a sparse operation, such as a sparse half-precision MMA (HMMA) operation. Matrix A is a sparse matrix that is initially 16×16 in size. Matrix A can be condensed, using a 2/4 sparsity constraint, to a 16×8 matrix with a bit-vector for zero/non-zero information. Because at most two of four elements can be non-zero, that means that at least two of the four elements will have zero values that can thus be skipped during processing. For the compression, each eight entry row can then be condensed into a row with four non-zero entries. As mentioned, in other embodiments each eight entry column might instead be condensed, or a block-based approach might be used that is not limited to just rows or columns, etc. In this example, the A matrix can be compressed from 512 bytes down to 256 bytes, plus an extra 32 bytes in metadata in some embodiments. Logically matrix A is still 16×16, but due to the 50% sparsity the matrix is effectively 16×8. Dense matrix (operand) B is 256 bytes, and the resulting matrix C/D is 256 bytes for 16 bit output, which would have been the result of multiplying sparse matrix A by dense matrix B, but without the compression of sparse matrix A. Two results C and D are illustrated, as there may be an intermediate matrix result C that is fed to an optional accumulator to be output to the HMMA operation.

Figure 5:
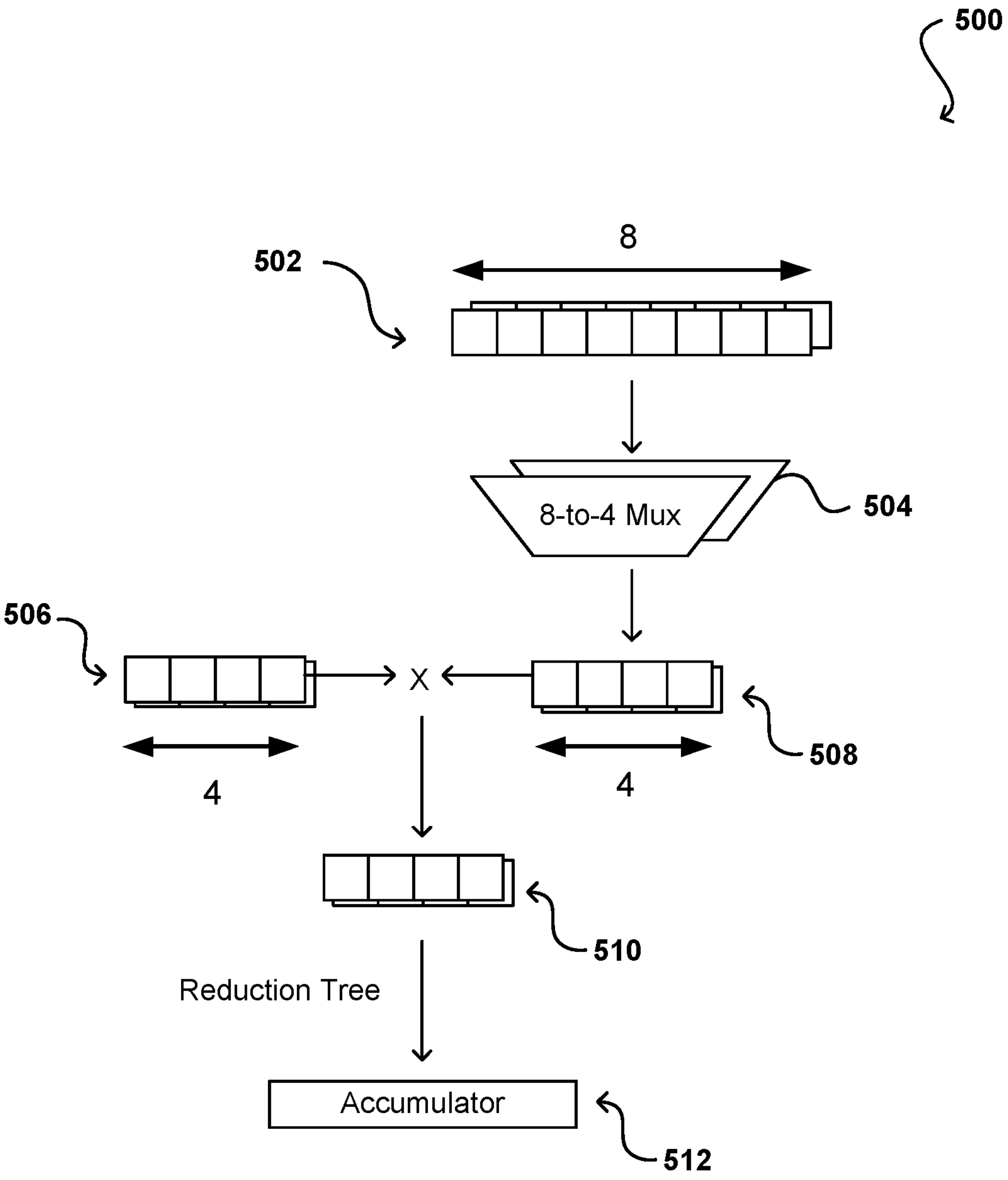
FIG. 5 illustrates an example approach to enforcing a global sparsity constraint that can be utilized in accordance with various embodiments.

FIG. 5 illustrates another view 500 of the example compression-based operation that can be utilized in accordance with various embodiments. In this example, a set of eight value rows 502 from the dense matrix is passed through one or more 8-4 multiplexers 504 to generate a set of four entry rows 508 of non-zero values. The result can then be multiplied by another set 506 of rows from the sparse matrix to produce a result, which can then be passed through a reduction tree to an accumulator 512, which can then assemble the resulting output matrix for the operation. It should be noted that such operations can be utilized with other inputs as well, such as may involve dot products with sparse vectors and other such options.

The view in FIG. 5 can correspond to a zoomed view to one of the dot products that can be performed using vectors A and B (aVec and bVec) in order to make up the full matrix operation multiplication illustrated in FIG. 4. The aVec 506 is four elements wide, as is the bVec 508. Since A is sparse, say at a 4/8 sparsity constraint, at most four out of the eight elements will have non-zero values. The full bVec 502 is eight elements wide, but since A is sparse only four elements of aVec may require any of the eight elements in bVec to perform the dot product. Since only four elements of bVec are needed, an 8-to-4 mux can be used to select the four relevant elements from the full bVec 502, using the corresponding index metadata from aVec. The four elements from aVec and the four elements from bVec can then be used to perform the dot product. Such an approach effectively performs an 8×8 dot product for the price of a 4×4 dot product, with a little additional muxing involved. The reduction tree and accumulator 512 can be conventional components used for dot product-related and other such operations. The zero value elements of the matrices can be selected in any appropriate manner as well, such as through user input or through a random number generator, among other such options.

In one embodiment, it can be advantageous to satisfy the sparsity constraint across the entire layer's weights or activations in order to maintain an even distribution of work. Such an approach may require intervention by the user, either in pruning the network for deployment or in inducing sparsity in the activations. Experiments with both approaches have shown promising results, simply by fine-tuning pre-trained networks. Favorable results were obtained for CNN pruning, and consistent results were observed for recurrent machine-translation networks when using sparsity-constrained weights during training. In at least some embodiments, improved results can be achieved when training networks from scratch, as the constrained network can converge more quickly and to a higher accuracy than the original network that was not necessarily so constrained. Even if the sparsity constraint is not met throughout an entire layer, allowing dedicated kernels to be used, this instruction can allow for various opportunistic benefits discussed herein. By executing more quickly, warps that happen to meet the constraint through fine-grained, unstructured pruning, or natural sparsity in various activations can be more efficient. Thus, pruning to the sparsity constraint can be considered to be an optional, but useful, step in some embodiments.

As mentioned, in some embodiments work may be distributed across multiple machines for processing. As known for load balancing, if one parallel machine or logical machine is busy then the work might be directed to another machine. Knowing that the chunks of the workload are relatively equivalent can help improve the distribution of load. In other embodiments, the global sparsity constraint may be determined based in part upon a current load of one or more machines. If resource availability is at a premium, then it may be desirable to apply a higher constraint in order to minimize additional work. If there is very little load, then a lower constraint might be set or a conventional approach might be utilized that does not utilize a sparsity constraint, among other such options.

In one example implementation there are a number of MMA cores that perform a matrix multiply operation over several cycles by performing a series of dot products. To implement a sparse version of that existing instruction with this constraint, one of the operands has a sparse constraint applied while the other operand would be dense. This corresponds to the situation discussed with respect to FIG. 4. The sparse operand would be received in compacted form. Instead of storing the sparsified matrix as a full sized matrix with many zero value elements, which wastes space and bandwidth, that matrix representation can be compressed. In various embodiments, the compression involves not storing the zero value elements and instead storing, for each chunk of M number of elements, the indices of the non-zero value elements. In one example of a 2/4 constraint, that corresponds to two bits per non-zero value element. The MMA instruction can then receive that sparse, compacted surface and the metadata surface, which in some embodiments comprises the indices of those non-zero values. From the dense operand, those indices can be used to select only the corresponding elements needed to compute the series of dot products with the sparse operand. Metadata can store other information in other embodiments that can be used for compression or zero value extraction, such as may include a raw index value for the matrix or an implicit offset from a specified index, or a lookup table, among other such options.

The sparsity constraint to be utilized for a given instance can depend on a number of different factors, as may relate to a state of the network in which the processing is to be performed. As mentioned, having higher sparsities can allow for the use of more sparsity patterns, which can be beneficial in at least some situations. Increasing the chunk size (at least with consistent ratio) can also allow for more generality as discussed and suggested herein. The determination of the applicable constraint can also depend at least in part upon the resiliency of the workload to the sparsification process. An attempt can be made to prune a network during training or after training using a fine tuning process, and it may not work. An attempt can then be made to prune less aggressively, or at least to prune less of the network. That process in itself can be fairly complicated and undesirable in at least some situations. Further, there are various pruning techniques available for use, and the selection of the constraint in most instances can be independent of the pruning process but not the pruned result.

When compressing the sparse matrix, the metadata overhead can afford to be so small because the scope at which the compression applies is limited. If it were necessary to store index values which could point to any location within a matrix then those index values would have to be much larger and would require more bits for storage than are provided for herein. Since approaches in accordance with various embodiments limit the index value to a specific range, such as from 0 to 3 for a 2×2 submatrix or a 1×4 vector, only two additional bits per index value are required. There are various instructions that can be used to generate the metadata and feed the data to the sparse MMA.

In embodiments where only sparse weights are considered, the process can be performed offline and out of the critical path. Weights are values that typically will be reused many times without modification during inference once a network is trained. Even during training the sparsity pattern can be maintained constant for a significant length of time. Activations relate to the data flowing through the network that will change with input provided to the network. If it is desired to leverage this constrained, structured sparsity with the sparse MMA instructions with the activations as the sparse operand, leaving the weights dense, it may be necessary in at least some embodiments to utilize a mechanism capable of quickly generating those sparse, compressed activations. This is one place where the instruction to generate the metadata and collapse the sparsified surface can come into play. In other embodiments, other types of data may be handled in this way if it is amendable to being sparse, so the process is not limited to just weights and activations. Further, the sparsity may be greater than the hardware support for acceleration in some embodiments, which can allow for partial decompression of the sparse matrices before processing.

As mentioned, aspects of various embodiments can be used advantageously with Half Precision Matrix Multiply-Add Instruction (HMMA) operations. Half precision data and instruction in a GPU architecture, such as Tensor Core, are significant contributors to high throughput. Compared to single precision, half precision data only requires half memory bandwidth and footprint, resulting in faster data transfer. An example GPU architecture can perform one type of operation, such as matrix-multiply-and-accumulate on 4×4 matrices. Therefore, a programming interface can express the general matrix-to-matrix multiplication operation. The operation can consist of the multiplication of two matrices A and B and accumulation of the result into a third matrix C, as discussed with respect to FIG. 5. Different architectures can allow for processing of different size matrices, as well as non-square matrix multiplication with different sizes. A given GPU microarchitecture can perform one matrix-multiply and-accumulate on 4×4 matrices per clock cycle. An accelerator may provide hundreds of processor components, such as Tensor Cores. An HMMA-based approach can be used for programming matrix-multiply-and-accumulate on individual processor units.

In one example, each processor component can perform a multiplication of two matrices with half precision floating-point entries, and can add the result to an accumulator in single precision. As mentioned, using matrix multiplication in half precision enables the matrix entries that are multiplied in a neural network to be small with respect to the value of the previous iteration. The multiplication result can then also be small in value, but will be accumulated to another value that might be much larger. To avoid precision loss or use additional computation, accumulation can be performed in single precision. In addition, deep neural network training approaches may tolerate a certain amount of precision loss. Thus, high precision calculations may not be not critical for the training of many deep neural networks.

Such approaches can be used advantageously in various situations where sparse matrix multiplication may be utilized. As mentioned, one such situation involves deep learning. The propagation of activations for deep neural networks often use sparse weights, where the weightings themselves may be sparse matrices. Such approaches can reduce the overhead of representing these sparse weights for machine learning, while improving the locality of accessing the sparse weights when needed for activation multiplication.

Each submatrix satisfying a sparsity constraint can be represented in an existing or conventional format. An advantage of such an approach is that each submatrix will have a small range of indices, allowing for an eight bit index representation in some embodiments. A sparse matrix may also utilize a nested matrix format in some embodiments, including empty submatrices as well as sparse and dense submatrices. Such a nested CSR (or CSC, CSB) format can be used advantageously as discussed herein. In one embodiment each matrix is a 256×256 matrix. Other dimensions are possible as well as discussed herein, such as 256×128, 128×512, etc. In some embodiments height and width values can be selected in order to minimize cache misses, and the height and width values may also depend in some extent upon the density of the matrix (i.e., the ratio of the number of zero-value elements to the number of non-zero value elements). An entire matrix can then be covered with submatrices, such that each element belongs to one and only one submatrix. The non-zero elements that go into each submatrix can be represented in a standard format, such as CSR. Another advantage is that the separation of a single matrix into a set of submatrices enables the various submatrices to be processed concurrently, which can improve the speed of processing and result in reduced latency of operations. The use of such a format differs from existing approaches further in the fact that the format considers the matrix elements in blocks, instead of in rows or columns.

As mentioned, such approaches can be used advantageously to handle the sparsity in deep neural networks. Deep Neural Networks (DNNs), such as Convolutional and Recurrent Neural Networks (CNNs and RNNs, respectively), are very powerful tools for solving various problems, but require accordingly powerful hardware to produce and use. As such, there has been much work in simplifying these networks to reduce the computational and memory requirements, leading to the application of techniques such as singular-value decomposition, quantization, and network pruning. This last technique has reduced the effective size of a variety of models, but does not always lead to a performance increase as the resulting sparsity is hard to take advantage of unless extra care is taken to make the sparsity pattern regular by design. Typical densities for pruned recurrent networks are around 10%.

Figure 6:
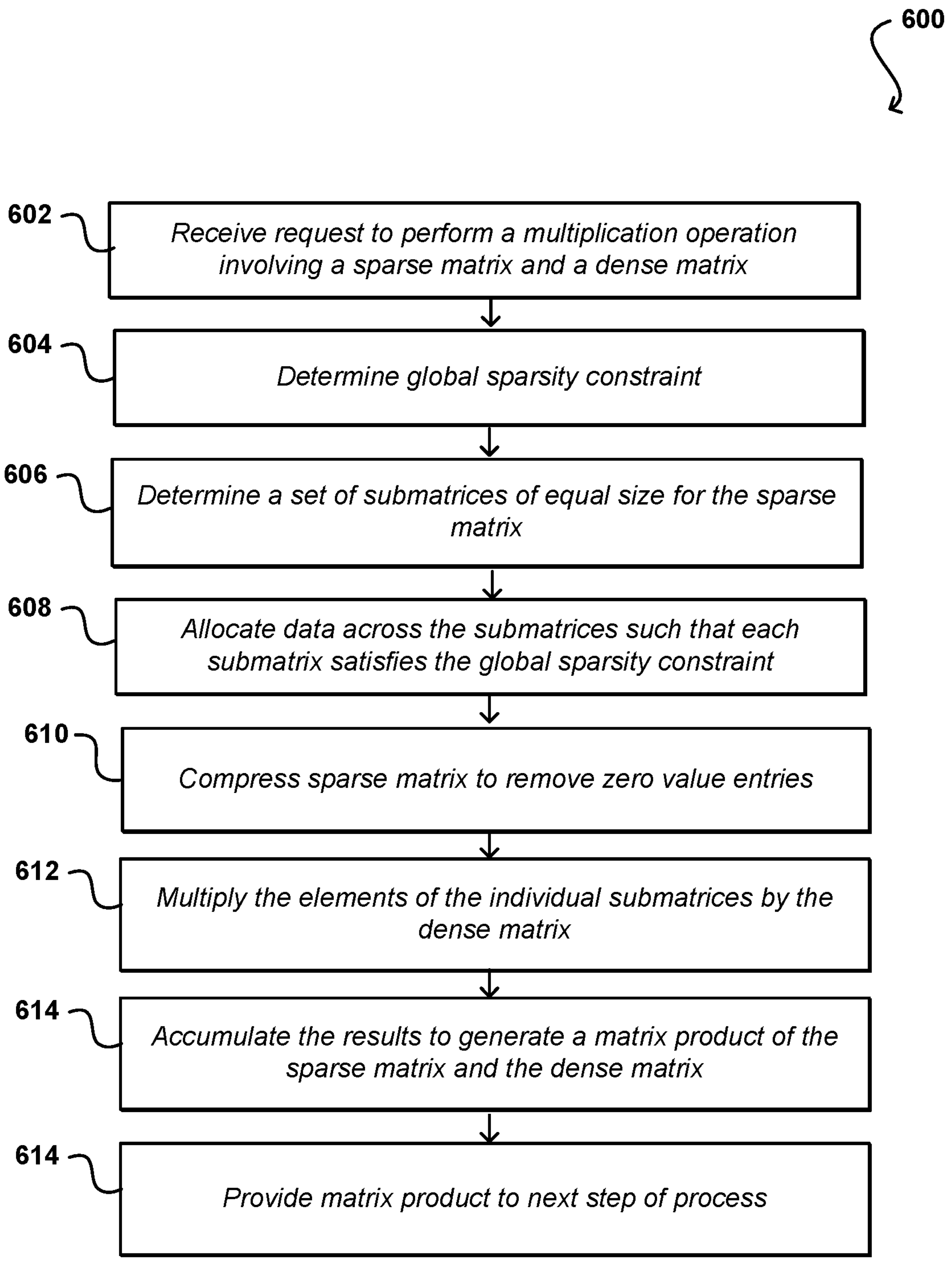
FIG. 6 illustrates an example process for enforcing a global sparsity constraint that can be utilized in accordance with various embodiments.

FIG. 6 illustrates an example process 600 for enforcing a global sparsity constraint on submatrices for sparse matrix multiplication that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request to perform a multiplication operation is received 602, where that operation involves a sparse matrix and a dense matrix. Various other matrix operation requests can be received as well within the scope of the various embodiments. A global sparsity constraint for the operation is determined 604, where that sparsity may define a minimum number of zero-value entities, or a maximum number of non-zero value entities, in the sparse matrix. A set of submatrices of equal size are determined 606 such that each element of the submatrix is contained in one, and only one, submatrix. The data can be allocated 608 across the submatrices such that each submatrix satisfies the global sparsity constraint. The sparse matrix can then, in some embodiments, be compressed 610 to remove a specified number of zero value entities, with only information for the indices of those entities being retained. As mentioned elsewhere herein, however, compression may not be performed in all embodiments, or may be performed in different ways. The sparse matrix may be condensed from, for example, a 16×16 matrix to a 16×8 matrix by excluding a number of zero values entities as may correspond to the global sparsity constraint. The elements of the individual submatrices can then be multiplied 612 by the corresponding elements of the dense submatrix, and the results accumulated 614 to generate a matrix product of the sparse matrix and the dense matrix. The matrix product can then be provided 614 to the next step of the overall process, as may involve the training of a neural network or the determination of one or more inferences using a neural network, among other such options.

In some embodiments the compression can be leveraged to allow for concurrent processing. For example, two submatrices might each be compressed to 50% their original sizes. This may allow for both matrices to be processed together in order to more fully utilize the available resources. In some embodiments, both submatrices are passed to a function, process, or neural network, and the output of the network is the result for the two matrices. In some embodiments the sparsity constraint can be selected to allow for a certain amount of concurrent processing.

In some embodiments an L1 cache (or other such cache or temporary storage) can be used rather than shared memory. A submatrix (or tile) of the sparse matrix can be loaded into the L1 cache then multiplied by the dense matrix. An advantage of using the L1 cache is that there is no need to synchronize each time the matrix tile is loaded into the L1 cache. In shared memory all threads have to wait until everything for the tile is loaded in shared memory, in at least some embodiments. Tiles can also be split into sub-tiles and processed on different threads in some embodiments, while multiple layers of tiling can be used in various embodiments for very large matrices.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it got smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 7:
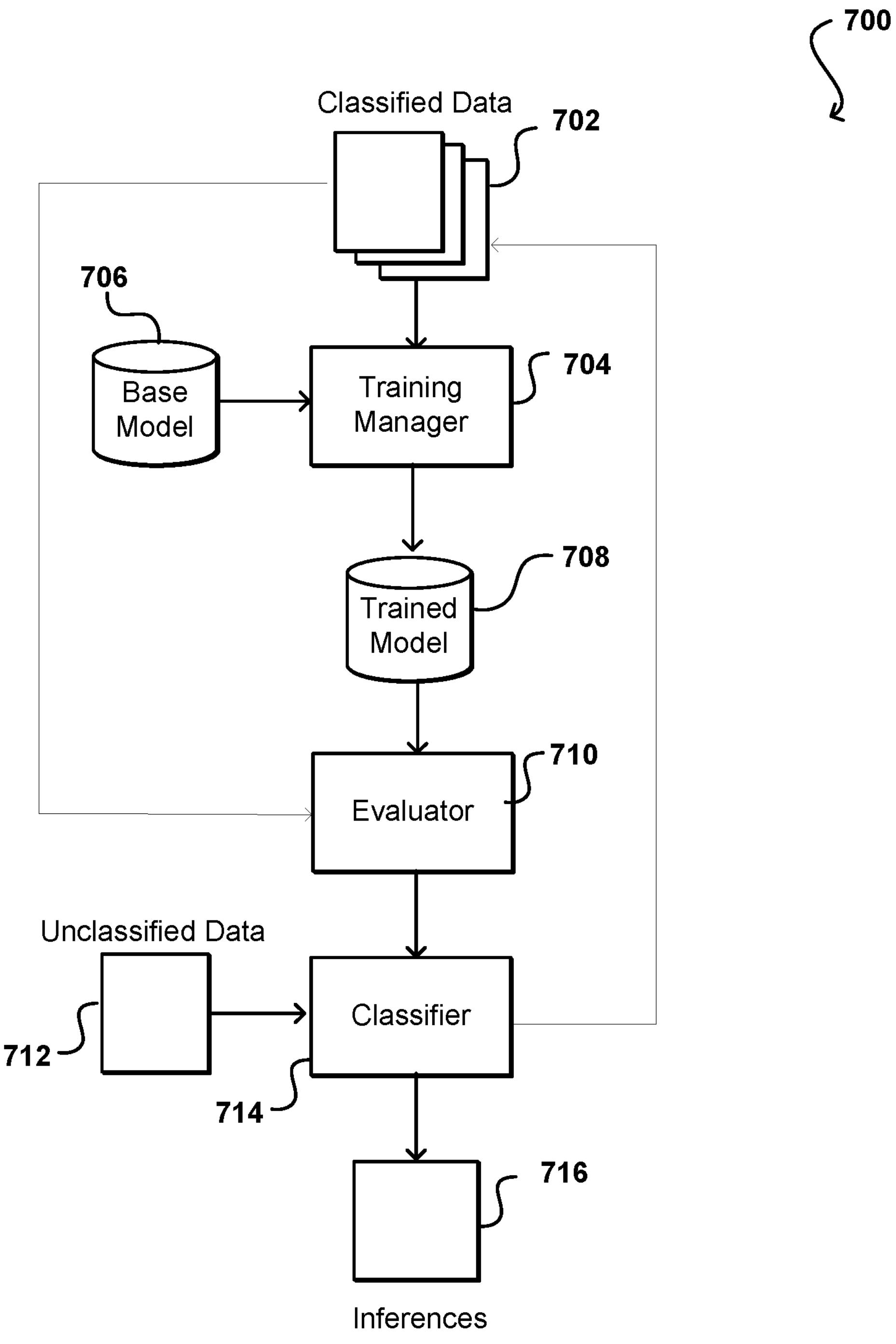
FIG. 7 illustrates an example system for training an image classification network that can be utilized in accordance with various embodiments.

FIG. 7 illustrates an example system 700 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 702 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 702 in this example is provided as training input to a training manager 704. The training manager 704 can be a system or service that includes hardware and software, such as one or more computing devices executing a training application, for training the statistical model. In this example, the training manager 704 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 704 can select a base model, or other untrained model, from an appropriate repository 706 and utilize the classified data 702 to train the model, generating a trained model 708 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 708 can be provided for use by a classifier 714 in classifying unclassified data 712. In many embodiments, however, the trained model 708 will first be passed to an evaluator 710, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known and use this assessment as a proxy for predictive accuracy on future data.

In some embodiments, a model is evaluated using a subset of the classified data 702 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 708 and the evaluator 710 can determine the accuracy of the model by comparing the ground truth data against the corresponding output (or predictions/observations) of the model. The evaluator 710 in some embodiments can provide a summary or performance metric indicating how well the predicted and true values match. If the trained model does not satisfy at least a minimum performance criterion, or other such accuracy threshold, then the training manager 704 can be instructed to perform further training, or in some instances try training a new or different model, among other such options. If the trained model 708 satisfies the relevant criteria, then the trained model can be provided for use by the classifier 714.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources but has failed to generalize the patterns in the data. Overfitting often occurs when the training data includes all of the data used in the evaluation. A model that has been over fit may perform well during evaluation but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 700 of FIG. 7, the trained model 710 after evaluation is provided, or made available, to a classifier 714 that is able to use the trained model to process unclassified data. This may include, for example, data received from users or third parties that are not classified, such as query images that are looking for information about what is represented in those images. The unclassified data can be processed by the classifier using the trained model, and the results 716 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 708 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances, the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 8:
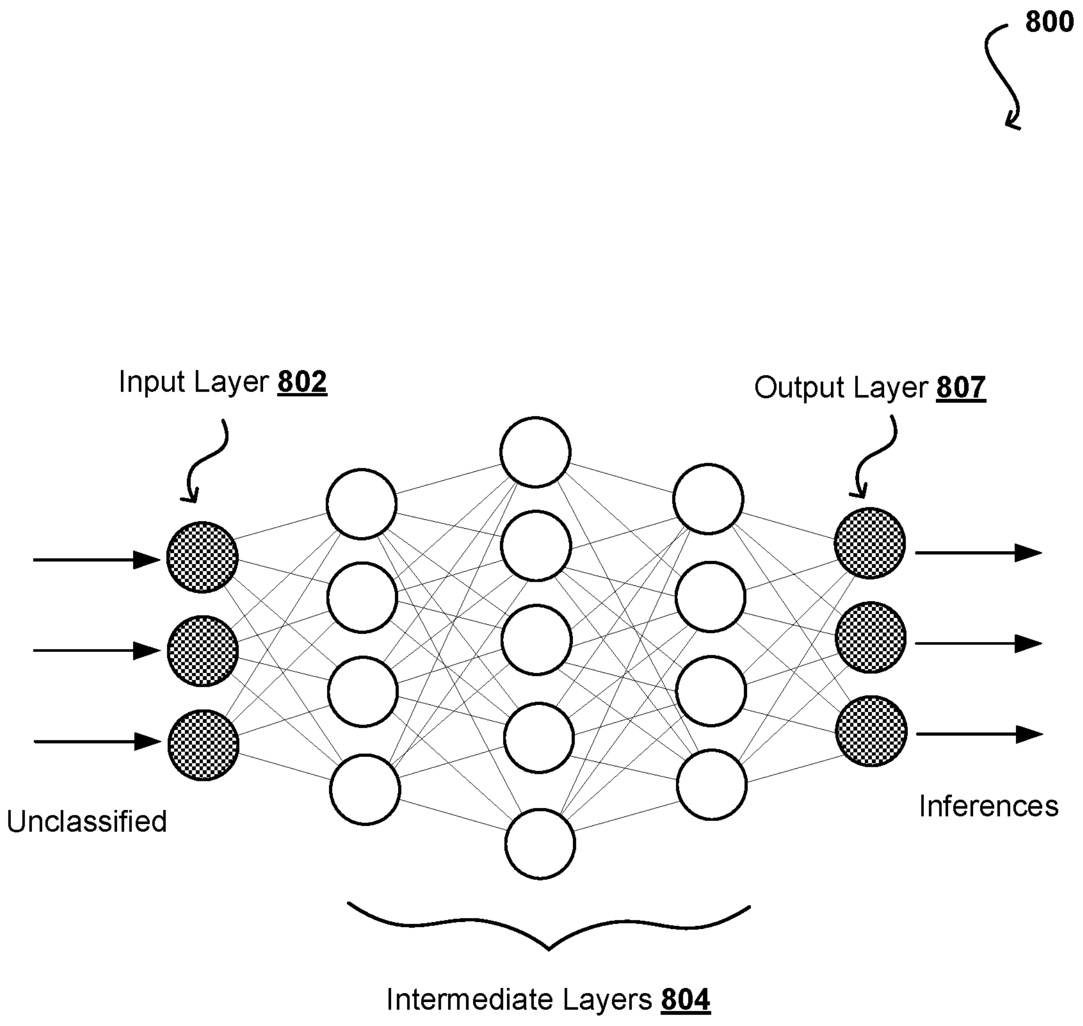
FIG. 8 illustrates layers of an example statistical model that can be utilized in accordance with various embodiments.

FIG. 8 illustrates an example neural network 800, or other statistical model, that can be utilized in accordance with various embodiments. In this example the statistical model is an artificial neural network (ANN) that includes a multiple layers of nodes, including an input layer 802, an output layer 806, and multiple layers 804 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 9:
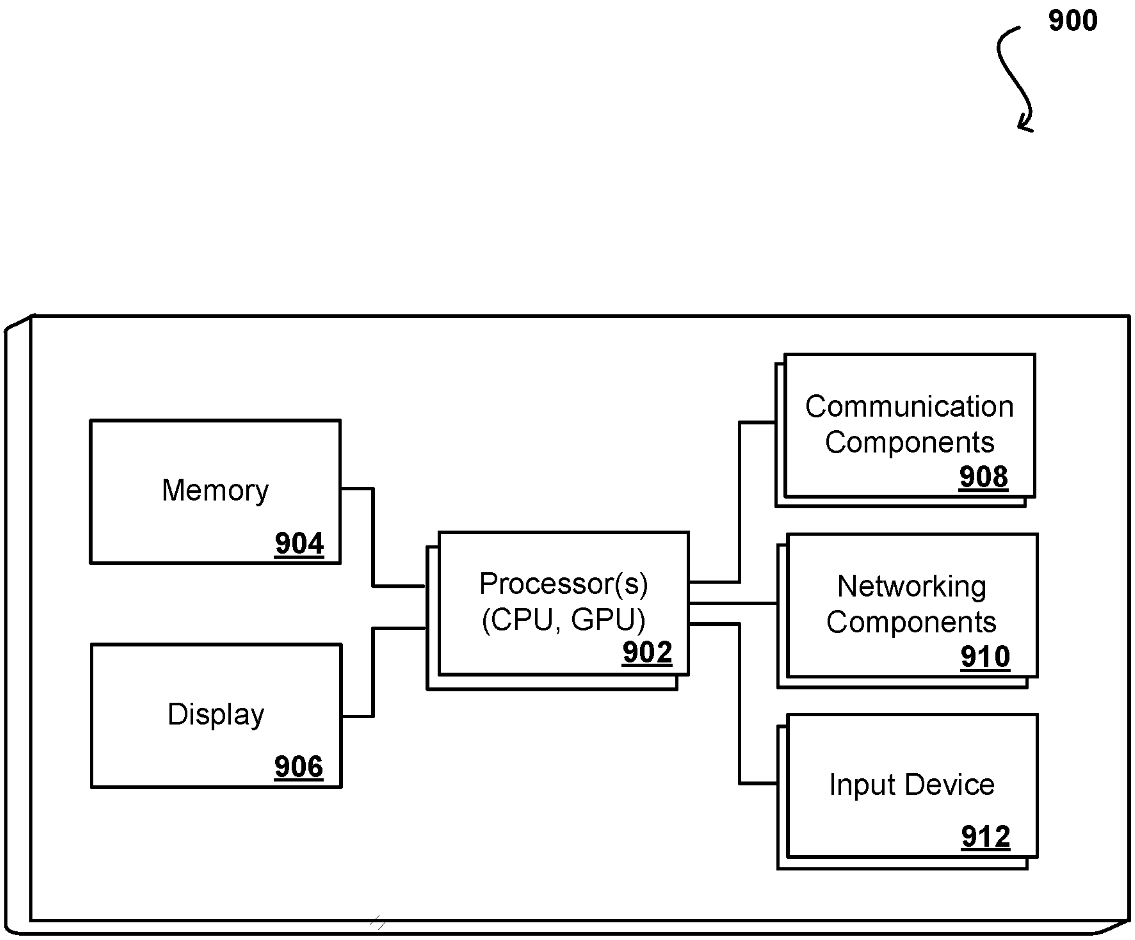
FIG. 9 illustrates example components of a computing device that can be used to implement aspects of the various embodiments.

FIG. 9 illustrates a set of basic components of a computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the processor 902, the same or separate storage can be used for images or data, a removable memory can be available for sharing information with other devices, and any number of communication approaches can be available for sharing with other devices. The device typically will include some type of display element 906, such as a touch screen, organic light emitting diode (OLED) or liquid crystal display (LCD), although devices such as portable media players might convey information via other means, such as through audio speakers. As discussed, the device in many embodiments will include at least communication component 908 and/or networking components 910, such as may support wired or wireless communications over at least one network, such as the Internet, a local area network (LAN), Bluetooth®, or a cellular network, among other such options. The components can enable the device to communicate with remote systems or services. The device can also include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Some devices might utilize one or more arithmetic logic units (ALUs) to perform various operations. An ALU is an electronic circuit that is configured to perform arithmetic and bitwise operations on integer binary numbers. An ALU may be utilized in various processing components, such as a GPU, CPU, or floating point unit (FPU), each of which may contain multiple ALUs. The inputs to an ALU are often referred to as operands, or the data on which operations are to be performed, as well as indication of the operation to be performed. The output of an ALU is then the result of the operation performed. An ALU may also have status inputs and/or outputs, which can convey information about an operation between the ALU and external status registers.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor, comprising:

one or more circuits to;

identify a matrix multiplication operation subject to a sparsity constraint indicating a required minimum number of zero-values for a sparsity pattern repeated across one or more matrix operands of the matrix multiplication operation; and responsive to the one or more matrix operands satisfying the sparsity constraint, compress the one or more matrix operands of the matrix multiplication operation to exclude a plurality of zero-values from the one or more matrix operands according to the sparsity pattern.

2. The processor of claim 1, wherein the one or more matrix operands are operands in matrix multiply-add (MMA) operations, and wherein the one or more matrix operands correspond to at least one of weights or activations of one or more neural networks.

3. The processor of claim 1, wherein compressing the one or more matrix operands comprises reducing a number of rows or a number of columns of the one or more matrix operands.

4. The processor of claim 3, wherein the one or more circuits are further to store metadata corresponding to the plurality of zero values excluded from the one or more matrix operands.

5. The processor of claim 1, wherein the one or more circuits are further to:

determine a plurality of submatrices of equal size and in accordance with sparsity pattern of the one or more matrix operands such that each element of a respective submatrix is contained in one and only one submatrix.

6. The processor of claim 5, wherein the plurality of submatrices are generated in a compressed sparse row (CSR) format, compressed sparse column (CSC), or a compressed sparse block (CSB) format.

7. The processor of claim 1, wherein the one or more circuits are further to ensure that a first operand of the one or more matrix operands corresponds to one or more sparse matrices and a second operand of the one or more matrix operands operations corresponds to one or more dense matrices.

8. A system, comprising:

one or more computers comprising one or more processors to:

determine a matrix multiplication operation subject to a sparsity constraint indicating a required minimum number of zero-values for a sparsity pattern repeated across one or more matrix operands of the matrix multiplication operation; and responsive to the one or more matrix operands satisfying the sparsity constraint, compress the one or more matrix operands of the matrix multiplication operation to exclude a plurality of zero-values from the one or more matrix operands according to the sparsity pattern.

9. The system of claim 8, wherein the one or more matrix operands are operands in matrix multiply-add (MMA) operations, and wherein the one or more matrix operands correspond to at least one of weights or activations of one or more neural networks.

10. The system of claim 8, wherein the one or more processors are further to compress the one or more matrix operands by excluding one or more zero values from the one or more matrix operands and reducing a number of rows or a number of columns of the one or more matrix operands.

11. The system of claim 10, wherein the one or more processors are further to store metadata corresponding to the one or more zero values excluded from the one or more matrix operands.

12. The system of claim 8, wherein the one or more processors are further to determine a plurality of submatrices of the one or more matrix operands and further constrain the sparsity across the plurality of submatrices.

13. The system of claim 12, wherein the plurality of submatrices are generated in a compressed sparse row (CSR) format, or a compressed sparse column (CSC) format, or a compressed sparse block (CSB).

14. The system of claim 8, wherein the one or more processors are further to ensure that a first operand of the one or more matrix multiply operands corresponds to one or more sparse matrices and a second operand of the one or more matrix multiply operands corresponds to one or more dense matrices.

15. A method, comprising:

identifying a matrix multiplication operation subject to a sparsity constraint indicating a required minimum number of zero-values for a sparsity pattern repeated across one or more matrix operands of the matrix multiplication operation; and responsive to the one or more matrix operands satisfying the sparsity constraint, compressing the one or more matrix operands of the matrix multiplication operation to exclude a plurality of zero-values from the one or more matrix operands according to the sparsity pattern.

16. The method of claim 15, wherein the one or more matrix operands are operands in matrix multiply-add (MMA) operations, and wherein the one or more matrix operands correspond to at least one of weights or activations of one or more neural networks.

17. The method of claim 15, wherein compressing the one or more matrix operands comprises reducing a number of rows or a number of columns of the one or more matrix operands.

18. The method of claim 17, further comprising storing metadata corresponding to the one or more zero values excluded from the one or more matrix operands.

19. The method of claim 15, further comprising determining a plurality of submatrices of the one or more matrix operands, and further constraining the sparsity across the plurality of submatrices.

20. The method of claim 15, further comprising ensuring that a first operand of the one or more matrix operands corresponds to one or more sparse matrices and a second operand of the one or more matrix operands corresponds to one or more dense matrices.

* * * * *